(12) United States Patent
Maguire

(10) Patent No.: US 9,161,303 B2
(45) Date of Patent: *Oct. 13, 2015

(54) DUAL MODE WIRELESS COMMUNICATIONS DEVICE

(71) Applicant: Facebook, Inc., Menlo Park, CA (US)

(72) Inventor: Yael Maguire, Boston, MA (US)

(73) Assignee: Facebook, Inc., Menlo Park, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 13/944,660

(22) Filed: Jul. 17, 2013

(65) Prior Publication Data

US 2013/0303225 A1 Nov. 14, 2013

Related U.S. Application Data

(63) Continuation of application No. 13/118,700, filed on May 31, 2011, now Pat. No. 8,644,892.

(51) Int. Cl.
*H04M 1/00* (2006.01)
*H04B 1/38* (2015.01)
(Continued)

(52) U.S. Cl.
CPC ........... *H04W 52/0212* (2013.01); *H02J 17/00* (2013.01); *H04M 1/7253* (2013.01); *H02J 7/025* (2013.01); *H04M 2250/04* (2013.01)

(58) Field of Classification Search
CPC ........... H02J 7/025; H02J 5/005; H02J 17/00; H02J 7/0004; H02J 7/02; H04B 5/0037; H04B 5/0075; H04B 5/0081; H04W 76/023; H01F 38/14

USPC ............. 455/41.1, 66.1, 73, 127.1, 522, 572, 455/573, 574; 320/106, 108, 109, 110, 112, 320/114, 115, 124, 139, 140; 307/104, 106, 307/149

See application file for complete search history.

(56) References Cited

U.S. PATENT DOCUMENTS

| 4,020,296 A | 4/1977 | Dahlquist |
| 5,503,350 A | 4/1996 | Foote |

(Continued)

FOREIGN PATENT DOCUMENTS

| CN | 102027654 A | 4/2011 |
| JP | 2004-110788 | 4/2004 |

(Continued)

OTHER PUBLICATIONS

Supplementary European Search Report and European Search Opinion for European Patent Application No. 12792895.0, Nov. 14, 2014.

(Continued)

*Primary Examiner* — Olumide T Ajibade Akonai
(74) *Attorney, Agent, or Firm* — Baker Botts L.L.P.

(57) ABSTRACT

A wireless communications device includes a battery, a processing section coupled to the battery, and an RF interface. The battery is configured to provide power to operate the wireless communications device in a first mode of operation. The processing section is configured to operate on battery power in the first mode of operation. The RF interface is configured to receive an RF signal and generate operating power for the wireless communication device from the RF signal in a second mode of operation. The wireless communications device is configured to detect available RF power and enter the second mode of operation from the first mode of operation.

29 Claims, 13 Drawing Sheets

(51) Int. Cl.
*H04W 52/02* (2009.01)
*H02J 17/00* (2006.01)
*H04M 1/725* (2006.01)
*H02J 7/02* (2006.01)

(56) References Cited

U.S. PATENT DOCUMENTS

| | | |
|---|---|---|
| 5,963,012 A | 10/1999 | Garcia |
| 5,982,139 A | 11/1999 | Parise |
| 6,114,834 A | 9/2000 | Parise |
| 6,127,799 A | 10/2000 | Krishnan |
| 7,383,064 B2 | 6/2008 | Mickle |
| 7,443,057 B2 | 10/2008 | Nunally |
| 7,844,306 B2 | 11/2010 | Shearer |
| 7,898,215 B2 | 3/2011 | Nagatsuka |
| 8,024,012 B2 | 9/2011 | Clevenger |
| 8,054,037 B2 | 11/2011 | Nagatsuka |
| 8,402,094 B2 | 3/2013 | Bosworth |
| 8,583,190 B1 * | 11/2013 | Kopikare et al. ............. 455/574 |
| 8,644,892 B2 | 2/2014 | Maguire |
| 8,929,806 B2 | 1/2015 | Maguire |
| 2006/0100001 A1 | 5/2006 | Pratt |
| 2006/0238365 A1 | 10/2006 | Vecchione |
| 2007/0123323 A1 | 5/2007 | Zhu |
| 2007/0225831 A1 | 9/2007 | Sakurada |
| 2007/0243851 A1 | 10/2007 | Shoarinejad |
| 2008/0048869 A1 | 2/2008 | Wang |
| 2008/0139131 A1 | 6/2008 | Macphail |
| 2008/0261555 A1 | 10/2008 | Chen |
| 2009/0189739 A1 * | 7/2009 | Wang ........................... 340/10.1 |
| 2009/0201134 A1 | 8/2009 | Rofougaran |
| 2009/0312046 A1 | 12/2009 | Clevenger |
| 2010/0142509 A1 | 6/2010 | Zhu |
| 2010/0144392 A1 | 6/2010 | Felt |
| 2010/0231407 A1 | 9/2010 | Carr |
| 2010/0291869 A1 | 11/2010 | Wilson |
| 2010/0295663 A1 | 11/2010 | Shoarinejad |
| 2011/0080919 A1 * | 4/2011 | Ding et al. .................... 370/419 |
| 2011/0115432 A1 | 5/2011 | El-Maleh |
| 2011/0177787 A1 | 7/2011 | Hwang |
| 2011/0235627 A1 | 9/2011 | Wang |
| 2011/0244913 A1 | 10/2011 | Kim |
| 2011/0285349 A1 * | 11/2011 | Widmer et al. ............... 320/108 |
| 2012/0052923 A1 | 3/2012 | Park |
| 2012/0166433 A1 | 6/2012 | Tseng |
| 2012/0166532 A1 | 6/2012 | Juan |
| 2012/0309295 A1 | 12/2012 | Maguire |
| 2013/0092730 A1 | 4/2013 | Blinbaum |
| 2014/0113561 A1 | 4/2014 | Maguire |

FOREIGN PATENT DOCUMENTS

| | | |
|---|---|---|
| JP | 2007-199895 | 8/2007 |
| JP | 2009-503716 | 1/2009 |
| KR | 10-2004-0053931 | 6/2004 |
| KR | 10-2004-0107110 | 12/2004 |
| KR | 10-2010-0060168 A | 6/2010 |
| WO | WO 2007-095267 A2 | 8/2007 |
| WO | WO 2010-110618 A2 | 9/2010 |
| WO | WO 2012-166774 A2 | 12/2012 |
| WO | WO 2014-150999 | 9/2014 |

OTHER PUBLICATIONS

International Search Report and Written Opinion for International Application PCT/US2012/039951, Jan. 17, 2013.
International Search Report and Written Opinion for International Application PCT/US2014/024733, Aug. 13, 2014.
Non-Final Office Action for U.S. Appl. No. 13/118,693, Feb. 4, 2014.
Response to Non-Final Office Action for U.S. Appl. No. 13/118,693, May 29, 2014.
Final Office Action for U.S. Appl. No. 13/118,693, Jul. 30, 2014.
Non-Final Office Action for U.S. Appl. No. 13/118,700, Apr. 10, 2013.
Response to Non-Final Office Action for U.S. Appl. No. 13/118,700, Jul. 10, 2013.
Notice of Allowance for U.S. Appl. No. 13/118,693, Sep. 30, 2014.
Amendment After Allowance for U.S. Appl. No. 13/118,693, Oct. 15, 2014.
Corrected Notice of Allowance for U.S. Appl. No. 13/118,693, Nov. 20, 2014.
Notice of Allowance for U.S. Appl. No. 13/118,693, Dec. 1, 2014.
Notice of Allowance for U.S. Appl. No. 13/118,700, Oct. 2, 2013.
Non-Final Office Action for U.S. Appl. No. 13/842,156, Dec. 4, 2014.
Response to Non-Final Office Action for U.S. Appl. No. 13/842,156, Feb. 25, 2015.
The State Intellectual Property Office of the People's Republic of China's Search Report and Notification of First Office Action (with English translation) for Application No. 201280037635.8, Dec. 18, 2014.
Final Office Action for U.S. Appl. No. 13/842,156, Apr. 9, 2015.
MX Office Action from Mexican Institute of Industrial Property (IMPI) for MX Application No. MX/a/2013/014038 (with English translation), Feb. 27, 2015.
CA Office Action for Canadian Patent Application No. 2,836,588 from Canadian Intellectual Property Office Jul. 9, 2015.
JP Office Action Notification of Reason for Rejection for JP Patent Application No. 2015-142230 from Japan Patent Office (with English translation) Aug. 4, 2015.

* cited by examiner

DUAL MODE WIRELESS COMMUNICATIONS DEVICE

CROSS REFERENCE TO RELATED APPLICATIONS

This application is a continuation under 35 U.S.C. 120 of U.S. patent application Ser. No. 13/118,700, filed 31 May 2011. This application is related to co-pending U.S. patent application Ser. No. 13/118,693, titled "Passively Powering a Wireless Communications Device" by Yael Maguire, filed concurrently herewith, which is incorporated herein by reference in its entirety.

BACKGROUND

Current communication devices such as mobile phones and Bluetooth headsets require battery power to operate. Users must frequently recharge the batteries in order to operate the devices. Radio frequency identification (RFID) technology enables wireless RFID tags to send simple identification data without a battery using backscatter communication techniques. An RFID reader supplies power and communicates with the RFID tags through the use of radio frequency (RF) waves. RFID tags transfer a small amount of data to the RFID reader to communicate the tag's identification.

SUMMARY

According to one aspect, a wireless communication device that operates without batteries is provided. According to another aspect, a wireless communication device that can perform some communication functions without drawing power from the battery is provided. According to another aspect, a wireless communication device that can perform some communication functions using minimal amounts of battery power, and significantly less battery power than current communication devices, is provided.

According to one embodiment, a wireless device includes an RF interface configured to receive an RF signal and configured to provide an output data signal derived from the RF signal, logic circuitry configured to receive the output data signal and provide an output analog signal, and power circuitry coupled to the RF interface and configured to provide DC operating power derived from the RF signal to the RF interface and the logic circuitry. The wireless device includes a first impedance matching transformer having an input coupled to the logic circuitry and having an output, and a first transducer coupled to the output of the first impedance matching transformer and configured to produce an audio signal based on the output analog signal.

According to one embodiment, the wireless device may include a second transducer configured to receive an input audio signal and provide an input analog signal to the logic circuitry. The logic circuitry may be configured to receive the input analog signal and provide an input data signal based on the input analog signal to the RF interface. The RF interface may be configured to receive the input data signal and modulate the RF signal based on the input data signal. According to one embodiment, the wireless device may also include a second impedance matching transformer coupled between the second transducer and the logic circuitry. According to another embodiment, the first impedance matching transformer may include multiple switches, which may be configurable to adjust a turns ratio of the first impedance matching transformer. According to another embodiment, the logic circuitry may include a digital to analog converter having an output coupled to the first impedance matching transformer. The logic circuitry may include an analog to digital converter having an input coupled to the second transducer.

According to one embodiment, the wireless device may be configured as a wearable headset. According to another embodiment, the wireless device may include an image sensor configured to capture an image and provide data regarding the image to the logic circuitry.

In another embodiment, a wireless communication system includes a wireless device, a base station having at least one network connection and an RF transceiver configured to generate an RF signal and communicate with the wireless device using backscatter communication. The wireless device is configured to generate operating power for the wireless device from the RF signal. The wireless device is also configured to receive an audio signal and communicate data related to the audio signal to the base station using backscatter communication.

According to one embodiment, the wireless device of the wireless communication system may include logic circuitry configured to process signals within the wireless device, a first transducer configured to generate an audio output signal, and a second transducer configured to receive the input audio signal and provide an input analog signal to the logic circuitry. The logic circuitry may be configured to receive data from the RF signal and provide an output analog signal to the first transducer.

According to various embodiments, the wireless device may include a first impedance matching transformer coupled between the logic circuitry and the first transducer. The wireless device may include a second impedance matching transformer coupled between the second transducer and the logic circuitry. The logic circuitry may include a digital to analog converter having an output coupled to the first impedance matching transformer. The logic circuitry may include an analog to digital converter having an input coupled to the second transducer.

According to one embodiment, the wireless device is configured as a wearable headset. According to another embodiment, the wireless device includes an image sensor configured to capture an image and provide data regarding the image to the logic circuitry.

According to one embodiment, the wireless communication includes multiple wireless devices each having a unique address, and each configured to generate operating power from the RF signal. The base station may be configured to receive backscatter communication from each of the wireless devices. According to one embodiment, the base station may be configured to transmit data to each of the wireless devices using the RF signal.

In one embodiment, a method of operating a wireless device includes receiving an RF signal at the wireless device, generating an output data signal derived from the RF signal, converting the output data signal to an output analog signal using a first impedance matching device, deriving DC operating power for the wireless device from the RF signal, and using a first transducer of the wireless device coupled to an output of the impedance matching device to produce an output audio signal based on the output analog signal.

According to one embodiment, the method of operating a wireless device may include using a second transducer of the wireless device to receive an input audio signal, generating an input data signal based on the input audio signal, and modulating the RF signal based on the input data signal. According to another embodiment, the method may include using an image sensor of the wireless device to capture an image and provide data regarding the image to a source of the RF signal.

According to one embodiment of the method of operating a wireless device, generating an input data signal may include using a second impedance matching transformer having an input coupled to an output of the second transducer. According to another embodiment, using a first impedance matching transformer may include configuring a plurality of switches to adjust a turns ratio of the first impedance matching transformer. According to a further embodiment, converting the output data signal to an output analog signal may include using a digital to analog converter coupled to the first impedance matching transformer. According to another embodiment, generating an input data signal may include using an analog to digital converter coupled to the second transducer.

In one embodiment, a method of providing communication between a wireless device and a base station includes generating an RF signal from the base station, receiving the RF signal at the wireless device, deriving operating power for the wireless device from the RF signal, receiving an audio input signal at the wireless device, using the wireless device to modulate the RF signal based on the audio input signal to create a modulated RF signal, and receiving the modulated RF signal at the base station.

According to one embodiment of the method of providing communication between a wireless device and a base station, the wireless device may include a first transducer configured to generate an audio output signal and a second transducer configured to receive the audio input signal. The method may further include receiving data from the RF signal and providing an output signal to the first transducer based on the data received.

According to one embodiment of the method of providing communication between a wireless device and a base station, the method may include using a first impedance matching device at an input of the first transducer. In another embodiment, the method may include using a second impedance matching device at an output of the second transducer. According to another embodiment, the method may include converting the output data signal to an output analog signal using a digital to analog converter coupled to the first impedance matching transformer. In a further embodiment, the method may include using an analog to digital converter coupled to the second transducer.

According to one embodiment of the method of providing communication between a wireless device and a base station, the method may include using an image sensor of the wireless device to capture an image and providing data regarding the image to the base station. According to another embodiment, the method may include receiving text data by the wireless device and providing data related to the text data to the base station.

According to one embodiment of the method of providing communication between a wireless device and a base station, the method may include providing multiple wireless devices each having a unique address, and each configured to generate operating power from the RF signal. The method may include selecting one of the wireless devices by the base station using the unique address of the one of the wireless devices, and receiving backscatter communication from the one of the wireless devices. According to one embodiment, the method may include transmitting data from the base station to each of the wireless devices using the RF signal.

In one embodiment, a wireless communications device includes a battery configured to provide power to operate the wireless communications device in a first mode of operation, a processing section coupled to the battery and configured to operate on battery power in the first mode of operation, and an RF interface configured to receive an RF signal and generate operating power for the wireless communication device from the RF signal in a second mode of operation. The wireless communications device is configured to detect available RF power and enter the second mode of operation from the first mode of operation.

According to one embodiment, the wireless communications device may be configured to function as a cellular telephone, a tablet computer, or a notebook computer in the first mode of operation. According to another embodiment, the wireless communications device may be configured such that the processing section enters a sleep mode in the second mode of operation. The wireless device may be further configured to detect a fill state of a memory device and based on the fill state change the processing section from the sleep mode to an active mode and conduct data transfer with the memory device. The fill state may indicate that the memory is full, the memory is empty or the memory is a selected percent full or empty.

According to another embodiment, the RF interface of the wireless communications device may be configured to receive data from the RF signal in the second mode of operation and the wireless communications device may be configured to store the data in the memory device. In another embodiment, the RF interface may be configured to modulate the RF signal and provide backscatter communication with a source of the RF signal. According to another embodiment, the wireless communication device may be configured to read data from the memory and provide an output message to the source of the RF signal by modulating the RF signal. In another embodiment, the wireless communication device may be configured to read data from the memory and provide an output message to the source of the RF signal by modulating the RF signal.

In one embodiment, a method of communicating with a wireless communications device includes operating the wireless communications device in a first mode of operation using operating power supplied by a battery contained in the wireless communications device, detecting presence of an RF signal, and in response, operating the wireless communications device in a second mode of operation using operating power derived from the RF signal.

According to one embodiment, the method of communication with a wireless communications device may include, in the first mode of operation, operating the wireless communications device as a cellular telephone, a tablet computer or a notebook computer. According to another embodiment, the method may include detecting that a storage level of a memory has reached a limit, and changing a processor of the wireless communications device from an inactive state to an active state. In another embodiment, the method may include extracting data from the RF signal in the wireless communications device in the second mode of operation, and storing the data in the memory in the wireless communications device.

According to one embodiment, the method of communication with a wireless communications device may include moving data from the memory using the processor. In another embodiment, the method may include reading data from the memory and providing an output message from the wireless communications device by modulating the RF signal. According to another embodiment, the method may include modulating the RF signal by the wireless communications device to provide backscatter communication with a source of the RF signal.

According to one embodiment of the method of communication with a wireless communications device, modulating the RF signal may include modulating the RF signal with identification data of the wireless communications device. In another embodiment, the source of the RF signal may be a base station having at least one network connection, and the method may include receiving the identification data at the base station and providing the identification data to at least one remote device over the network connection. According to another embodiment, the method may include receiving at the base station from a remote device over the network connection a message for the wireless communications device, and modulating the RF signal to provide the message to the wireless communications device.

According to one embodiment of the method of communication with a wireless communications device, the source of the RF signal may be a base station having at least one network connection. The method may include receiving data from the wireless device at the base station and providing the data to a remote device over the network connection. According to another embodiment, the method may include reading data from the memory and providing an output message from the wireless communications device by modulating the RF signal.

In one embodiment, a wireless communication system includes a wireless device and a base station having at least one network connection and an RF transceiver configured to generate an RF signal and communicate with the wireless device using backscatter communication. The wireless device includes a battery configured to provide power to operate the wireless device in a first mode of operation, a processing section coupled to the battery and configured to operate on battery power in the first mode of operation, and an RF interface configured to receive the RF signal from the base station and generate operating power for the wireless device from the RF signal in a second mode of operation. The wireless device is configured to detect available RF power and enter the second mode of operation from the first mode of operation.

According to one embodiment, the wireless communication system may be configured to function as a cellular telephone, a tablet computer or a notebook computer in the first mode of operation. According to another embodiment, the wireless device may be configured such that the processing section enters a sleep mode in the second mode of operation, and the wireless device may be configured to detect a fill state of a memory device and based on the fill state change the processing section from the sleep mode to an active mode and conduct data transfer with the memory device.

According to one embodiment, the RF interface of the wireless communication system may be configured to receive data from the RF signal in the second mode of operation and the wireless device may be configured to store the data in the memory device. According to another embodiment, the RF interface may be configured to modulate the RF signal to provide data to the base station. In another embodiment, the wireless device may be configured to read data from the memory and provide an output message to the source of the RF signal by modulating the RF signal. In another embodiment, the RF interface may be configured to modulate the RF signal with identification data of the wireless device.

According to one embodiment, the base station of the wireless communication system may be configured to receive the identification data and provide the identification data to at least one remote device over the network connection. According to another embodiment, the base station may be further configured to receive from a remote device over the network connection a message for the wireless device, and modulate the RF signal to provide the message to the wireless device. In another embodiment, the base station may be configured to receive data from the wireless device at the base station and provide the data to a remote device over the network connection. According to another embodiment, the RF interface may be configured to receive data from the RF signal in the second mode of operation and the wireless device may be configured to store the data in the memory device.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
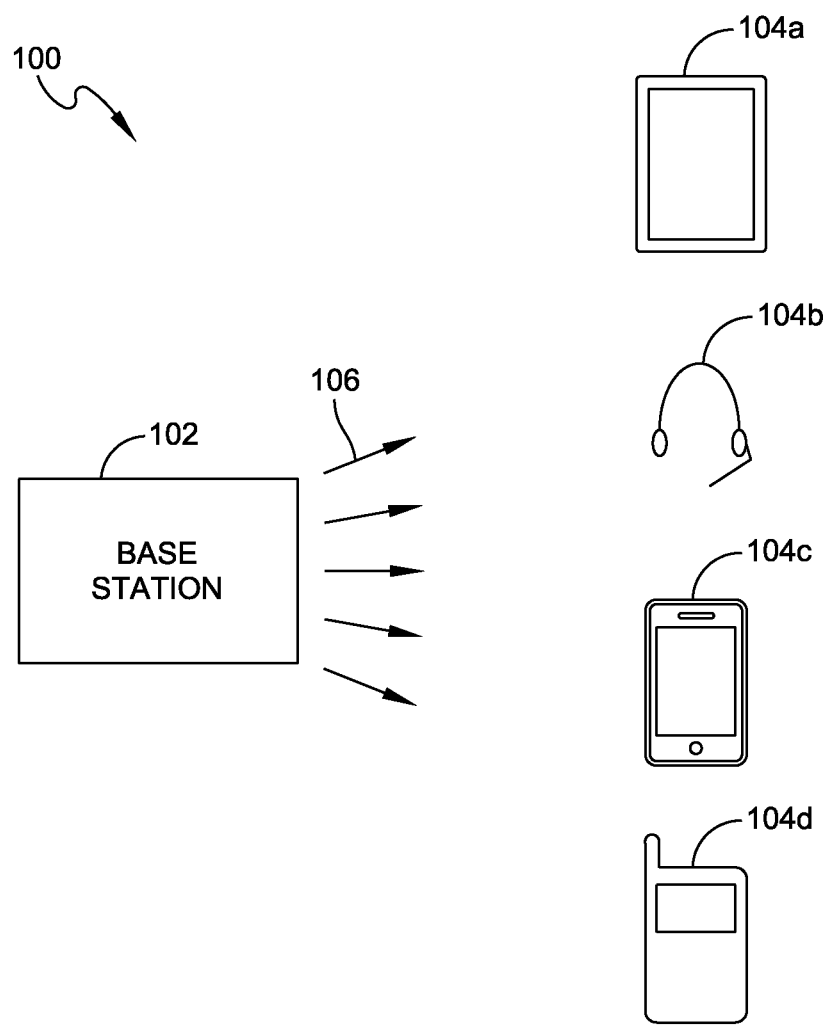
FIG. 1 is a diagram of a base station and multiple wireless communication devices in accordance with aspects of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

At least some embodiments of the invention provide low power wireless communication devices operable in some examples without the need for a battery and in other examples, wireless communication devices include a battery but have multiple modes of operation, at least some of which require no or little draw of power from the battery. The wireless communication devices in different examples include wireless headsets and handsets having a microphone and/or speakers operable with a number of different types of devices, such as cordless telephone systems, cellular or wired telephones, RF communication systems, such as walkie talkies, audio music players, remote controls, computer systems, including desktops, laptops and tablet computers. In other examples, wireless communication devices are provided that operate as cellular phones, cameras, video game controllers, smart phones, tablet computers and other devices that communicate over a wireless network to a base station that may include connections to one or more wired or wireless networks. In at least some examples, wireless devices are powered from RF signals that may or may not include input data for the wireless devices. Further, in at least some examples, wireless communications devices utilize backscatter communication techniques to communicate with a base station or other wireless devices.

FIG. 1 is a diagram of a communications system 100 in accordance with one embodiment of the invention. The communication system 100 includes a base station 102 and multiple wireless communication devices 104a, 104b, 104c and 104d. The base station 102 transmits an RF signal 106 received by the wireless communication devices.

According to one embodiment, the base station 102 is connected to a power source. The power source may be an electrical outlet. The base station 102 may also include one or more network interfaces for coupling to one or more wired or wireless networks, including, for example, a Local Area Network (LAN), a Wireleass Local Area Network (WLAN), a Wide Area Network (WAN), a cellular network or a Public Switched Telephone Network (PSTN).

According to various embodiments, wireless communication devices 104a-104d may include one or more mobile phones, iPhones, headphones, headsets (including a microphone and earphone), music players, iPods, personal digital assistants, iPads, laptops, computers, or cameras.

According to one embodiment, the wireless communication devices 104a-104d convert the received RF signal to a DC voltage to power internal components of the wireless devices 104a-104d. In one example, the wireless communication devices 104a-104d do not include a battery, and the RF signal is the only source of power.

According to another embodiment, the base station 102 includes an RF transceiver and communicates with the wireless communication devices 104a-104d using a backscatter modulation technique. The transceiver transmits to the wireless communication devices 104a-104d using amplitude or phase modulation. In some embodiments, the amplitude modulation is DSB-ASK (double sideband amplitude shift keying), PRASK (phase reversal amplitude shift keying) or SSB-ASK (single sideband amplitude shift keying). The wireless communication devices 104a-104d communicate back via backscatter modulation. In different embodiments, the base station 102 may operate in accordance with one or more RFID communication standards including GS1 Generation 2.

Figure 2:
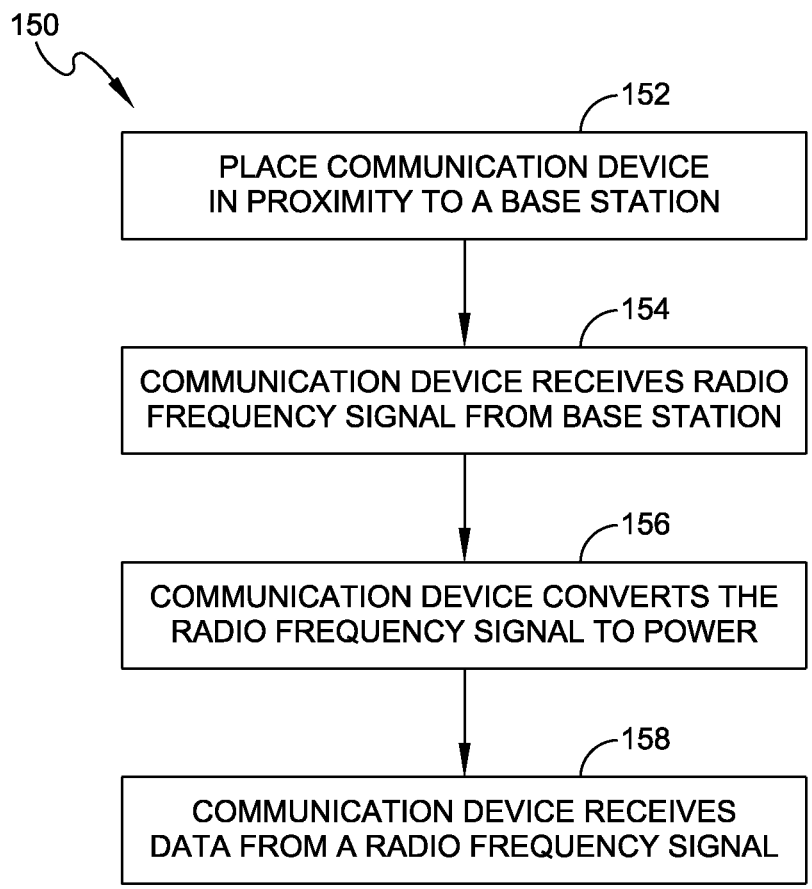
FIG. 2 is a flow chart of a method of operation of a wireless communication device in accordance with aspects of the present invention.

FIG. 2 is a flow chart of a method of operation 150 of a wireless communication device according to one embodiment. At block 152, a wireless communication device, such as wireless communication devices 104a-104d of FIG. 1, is placed in proximity to a base station. At block 154, the wireless communication device receives an RF signal from the base station. At block 156, the wireless communication device converts the RF signal to a DC voltage to power components of the wireless communication device. At block 158, the wireless communication device receives data from the RF signal from the base station.

At block 152, the wireless communication device is close enough to the base station such that the strength of the RF signal emitted by the base station is sufficient to power the wireless communication device and, depending on the functionality of the particular communication device, it can begin receiving data from or sending data to the base station. According to one example, the wireless communication device may be between about two feet and about sixty feet from the base station. In other examples, the distance between the wireless communication device and the base station is between about one inch and five feet, between about one foot and about ten feet, between about two feet and about ten feet, between about two feet and about twenty feet, between about five feet and about twenty feet, and between about five feet and about thirty feet. In other embodiments, depending on the RF communication technology used, other distances are possible.

As described above, at block 154, the wireless communication device receives an RF signal from the base station. In one example, the base station is continuously emitting an RF signal, and when the wireless communication device enters an area sufficiently proximate to the base station, it begins receiving the RF signal.

At block 156, the wireless communication device converts the RF signal to at least one DC voltage. In one embodiment, after the wireless communication device has received sufficient energy to power up, it may also begin to receive data from the RF signal, at block 158. The RF signal comprising the data may have a different source than the RF signal providing the power, or it may be transmitted from the same base station. According to one feature, the wireless communication device is operating in an area including multiple base stations, and RF signals from multiple base stations provide power to the wireless communication device. The wireless communication device may reply to the data-transmitting base station using backscatter modulation. In one embodiment, the base station emitting the RF signal that powers the wireless communication device is also the data-transmitting base station, and it includes a transmitter and a receiver that operate simultaneously with data communication occurring in one direction at a given time.

According to one embodiment, the RF signal is transmitted at a frequency between about 840 MHz and about 960 MHz. In another embodiment, the RF signal is transmitted at ISM-band frequencies, between about 2.403 GHz and about 2.483 GHz (used for WiFi). In a further embodiment, the RF signal is transmitted at five GHz U-NII band frequencies, between about 4915 MHz and about 5825 MHz (used for WiFi). According to another embodiment, the RF signal is transmitted at UMTS/LTE band frequencies, which may be about 800 MHz, about 850 MHz, about 900 MHz, about 1500 MHz, about 1700 MHz, about 1800 MHz, about 1900 MHz, or about 2100 MHz.

Figure 3:
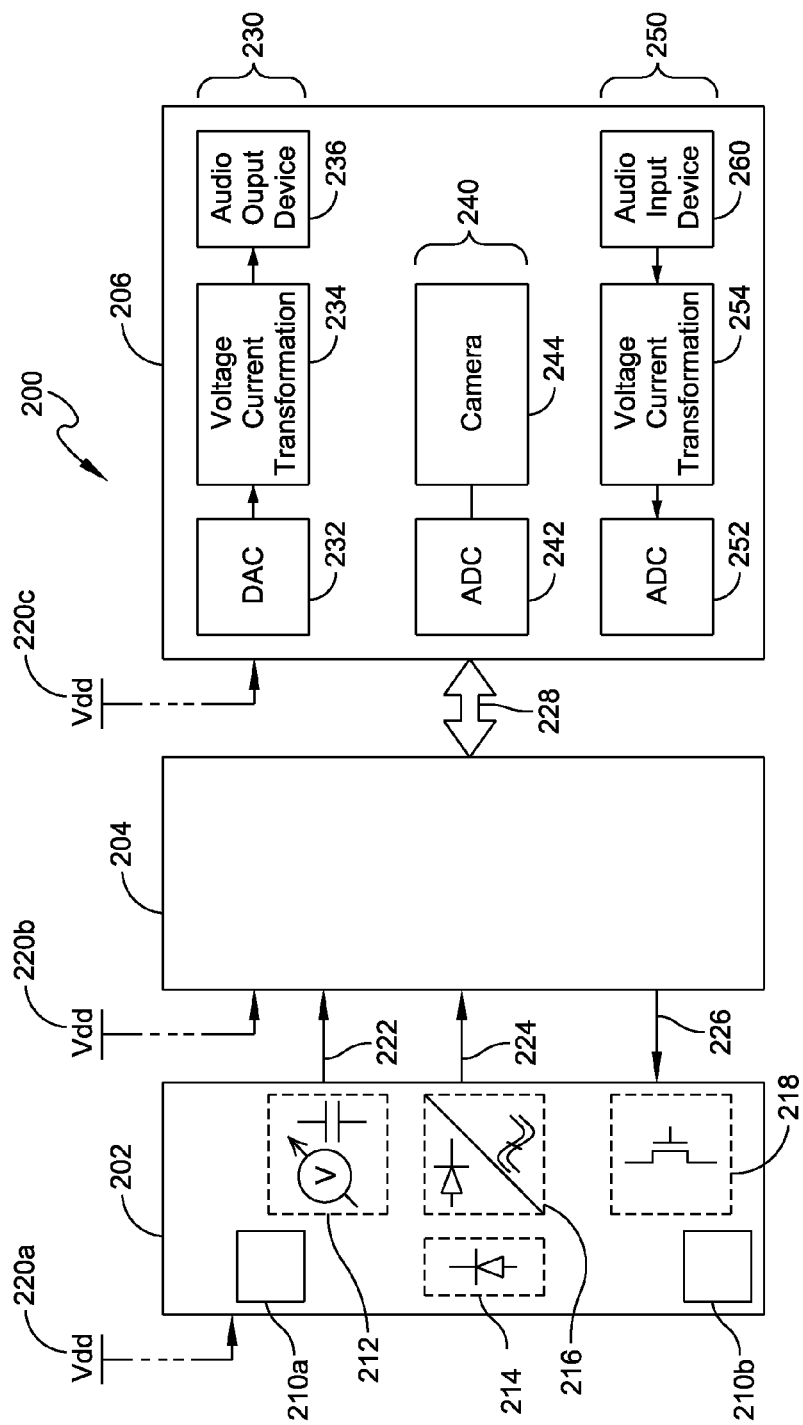
FIG. 3 is a block diagram showing several components of a wireless communication device in accordance with aspects of the present invention.

FIG. 3 is a block diagram 200 showing several components of a wireless communication device according to one embodiment of the invention. The components include an analog RF interface 202, a digital control block 204 and a sensor block 206.

The analog RF interface 202 includes antenna pads 210a and 210b, a voltage regulator 212, a rectifier 214, a demodulator 216 and a modulator 218. It may also include a voltage input 220a if an additional source of DC power, such as a battery, is included in the wireless device.

The digital control block 204 includes a voltage input 222 from the analog RF interface 202, and it may also include a voltage input 220b if an additional source of DC power, such as a battery, is included in the wireless device. In various embodiments, the digital control block 204 may include anti-collision technology, read/write control, access control, sensor interface control and a RF interface control. In one example, the digital control block 204 includes a finite state machine. In another example, the digital control block 204 includes a processor. In other embodiments, the digital control block may include a number of logic circuits and processors configured and/or programmed to perform functions described herein. According to one feature, the digital control block 204 converts a digital data packet received from the base station into an analog signal. According to another feature, the digital control block 204 converts an analog signal into a digital data packet for transmission to the base station.

The sensor block 206 includes an audio output section 230 and an audio input section 250. In other embodiments, the sensor block 206 may not include both an audio output section 230 and an audio input section 250. In other embodiments, the sensor block 206 may include one or more of a camera section 240, a video game controller section, and a texting interface. The sensor block 206 may also include a voltage input 220c if an additional source of DC power, such as a battery, is included in the wireless device.

The audio output section 230 includes a digital-to-analog converter 232, a voltage and current transformation module 234, and an audio output device 236. The audio output section is described in greater detail with respect to FIG. 4. In other embodiments, components of the audio output section 230 may be located in other functional blocks.

The audio input section 250 includes an audio input device 260, a voltage and current transformation module 254, and an analog-to-digital converter (ADC) 252. According to one embodiment, the sample-and-hold circuit 254 is integrated into the ADC 252. According to another embodiment, the audio input section 250 does not include a sample-and-hold circuit 254. The audio input section 250 is described in greater detail with respect to FIG. 6. In other embodiments, components of the audio output section 230 may be located in other functional blocks.

According to one aspect, the sensor block 206 receives digital data from the digital control block 204. For example, the sensor block 206 may receive digital audio output data from the digital control block 204. According to one embodiment, the sensor block 206 sends digital data to the digital control block 204. For example, the sensor block 206 may send digitized audio input data to the digital control block 204. In another example, the sensor block 206 sends digitized optical data such as a digital photograph to the digital control block 204.

According to one embodiment, the sensor block 206 receives digital audio output data in a compressed format and decodes it using a local state machine or processor. The digital control block 204 may receive digitized audio input and compress or encode the data using a state machine or processor. The RF protocol may have specific commands or state machine operations to allow the passing of compressed or uncompressed data. Various examples of an encoding/decoding algorithms include the LPC (Linear Predictive Coding), CELP (Code Excited Linear Prediction), SADVQ (Serial Adaptive Differential Vector Quantization), ACELP (Algebraic Code Excited Linear Prediction) and compressed sensing techniques. Other algorithms may also be used.

According to one feature, the analog RF interface 202 provides a DC voltage 222 to the digital control block 204 to power the components of the digital control block 204. According to some embodiments, the analog RF interface 202 sends data received from the base station to the digital control block 204.

According to another feature, the digital control block 204 sends data from the sensor block 206 to the analog RF interface 202. In various examples, the data may represent audio input data from a microphone 260, optical data from a camera 244 and text input from a keyboard or keypad.

According to one aspect, the analog RF interface 202, the digital control block 204 and the sensor block 206 are designed to use a minimal amount of power. For example, the digital control block 204 in one embodiment includes a finite state machine that draws minimal power. Similarly, the components of the sensor block 206 are designed to minimize power usage. A typical analog RF interface 202 and digital control block 204 uses about ten μW of power or less.

Figure 4:
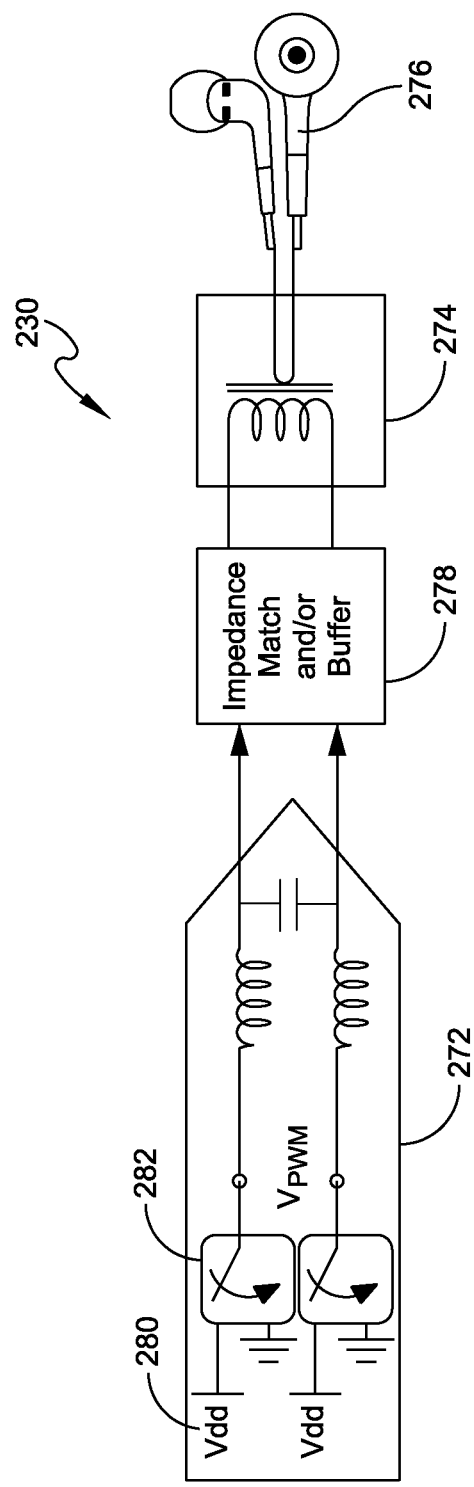
FIG. 4 is a schematic diagram of circuitry connected to earphones in accordance with aspects of the present invention.

FIG. 4 is a schematic diagram of one embodiment of the audio output section 230. The audio output section 230 includes a digital-to-analog converter (DAC) 272, an impedance matcher 278, a transformer 274 and earphones 276. The DAC 272 is connected to the impedance matcher 278 such that the output of the DAC 232 is input to the impedance matcher 278. The impedance matcher 278 is connected to the transformer 274 such that the output of the impedance matcher 278 is input to the transformer 274. The DAC 272, the impedance matcher 278 and the transformer 274 are designed to consume minimal power in transmitting the audio output signal to the earphones 276 by transforming the high voltage required for complementary metal oxide semiconductors (CMOS) or sub-threshold CMOS to the low voltage requirements of a magnetically-driven earphone.

In one embodiment, the DAC 272 includes a pulse width modulator, low-pass or band-pass low-loss filter, a voltage input 280 and a digital control 282. According to one feature, the DAC 272 including a pulse width modulator has a clock frequency equal to at least about twice the Nyquist frequency. When the clock frequency is greater than about twice the Nyquist frequency, there is an oversampling factor to describe the pulses. In one example, a 8 kHz audio signal with 8-bits of timing resolution would have a sampling rate of 2.048 megasamples per second MSPS (Fs*2^N). The LC tank circuit or higher order filter would be tuned to about 8 kHz. The filter may be a low-pass or band-pass filter.

In another embodiment, the DAC 272 includes a delta-sigma modulator and a low-pass or band-pass low-loss filter. According to one feature, the DAC 272 includes a delta-sigma modulator, and the oversampling ratio is the square root of the dynamic range in bits. In one example, an 8-bit kilosamples per second (kSPS) sigma-delta DAC would use 64 kSPS 1-bit samples and a first, second or third order low-pass filter tuned to about 8 kHz. In some embodiments, the delta-sigma modulator may be first-order, second-order or third-order. In one embodiment, the low-loss low-pass filter may be implemented with a single-pole inductor-capacitor pair. In another embodiment, the inductor may be one leg of the transformer.

In other examples, the DAC 272 can be another low power digital-to-analog converter. In one example, the DAC 272 has a maximum current between about 5.7 nA and about 180 nA at a maximum operating voltage of about 0.7 V. The audio power to power earphones or headphones, like headphones 276, may be defined using Equation 1.

$$P_{audio} = 1mW \cdot 10^{\frac{SPL_{conversation} - SPL_{headphone}}{10}} \quad (1)$$

where $P_{audio}$ is the audio power, $SPL_{conversion}$ is the sound pressure level of the conversation, and $SPL_{headphone}$ is the SPL generated from 1 mW of power. In one example, $SPL_{headphone}$ is 124 dB SPL/mW, and thus the headphones would use 1 µW to generate 94 dB SPL. The voltage of the headphones may be determined using Equation (2).

$$V_{headphone} = \sqrt{P_{audio} R_{headphone}} \quad (2)$$

where $V_{headphone}$ is the maximum voltage of the headphones and $R_{headphone}$ is the resistance of the headphones. The turns ratio for the transformer 234, in one embodiment, may be determined using Equation (3).

$$N_{turns} = \frac{D2AV_{max}}{V_{headphone}} \quad (3)$$

where $N_{turns}$ is the ratio of the number of turns of the primary coil of the inductor to the number of turns in the secondary coil of the inductor, and $D2AV_{max}$ is the maximum voltage of the DAC 272. The current at the DAC 272, in one embodiment, may be determined using Equation (4).

$$D2AI_{max} = \frac{V_{headphone}}{R_{headphone} N_{turns}} \quad (4)$$

where $D2AI_{max}$ is the current of the DAC 272. Note that these equations assume the transformer is 100% efficient. In other embodiments, $D2AV_{max}$ and $D2AI_{max}$ may be higher than would be calculated from these equations.

According to another example, the DAC 272 includes a buck converter or a step-down DC-to-DC converter using pulse-width modulation. In this example, energy is stored in an inductor, allowing the majority of the energy from the source digital electronics to be transferred to the audio generating earphones 236, increasing the efficiency of the system.

According to one implementation, the DAC 272 includes an additional capacitor, which is charged to a selected level and then discharged into a comparator. The comparator determines the timing of the voltage pulses and permits a higher pulse width modulation switching frequency. In one example, the DAC 272 uses sigma-delta modulation with a switching frequency of 8 kHz and an oversampling ratio of 32. In another example, the DAC uses sigma-delta modulation with a switching frequency of 256 kHz at one-bit.

The transformer 274 is an impedance transformer. The impedance transformer 274 converts the analog signal received from the DAC 272 to a lower voltage, higher current signal. In various examples, the transformer 274 has a turns ratio of about 410:1, about 840:1, or between about 410:1 and about 840:1. The specific design of the transformer 274 is selected based on characteristics of the earphones and provides an output impedance matched with the input impedance of the earphones.

One embodiment of the transformer 274 is an off-the shelf, miniaturized transformer with a ferrite magnetic core. According to one feature, a miniaturized transformer with a ferrite magnetic core is highly efficient. In another embodiment, the transformer 274 is fabricated using semiconductor fabrication techniques with a planar magnetic material on the substrate and an etched multi-layer coil providing a large number of turns on the DAC side. The number of turns on the DAC side may be, for example, about 400, about 500, about 600, about 700, about 800, about 850, or about 900. A mutli-layer coil on the other side provides a smaller number of turns (for example, one, two or more) on the electrical-to-sound pressure device (earphone).

In one embodiment of the semiconductor transformer 274, there are multiple arms feeding the transformer 274, each with a CMOS switch. The CMOS switch may be used to switch in a selected number of turns on the DAC side. According to one feature, the CMOS switch may be used to maximize efficiency to the fixed impedance of the earphones. In one embodiment, the turns ratio could be determined upon power-up and the switch configuration is stored in non-volatile memory. In another embodiment, the switch configuration is pre-configured.

According to some embodiments, the earphones 276 may include earphones or other electrical-to-audio transducers, including headphones, a speaker, or another audio output device. The power requirements for earphones generally vary between about 5 nW and about 300 nW for human conversation levels at 1 meter. For example, Ultimate Ears 7 Pro earphones use about 8 nW of power, Klipsch X5 earphones use about 32 nW of power, and Apple in-ear earphones use about 260 nW of power. These calculations are based on the power requirements to generate adequate sound pressure levels. Pressure is related to impedance and velocity:

$$p = Zv \quad (5)$$

where p is the pressure change from standard air pressure at 20° C., Z is the characteristic impedance of air at standard temperature and pressure and v is the root mean squared velocity of the particles in the air medium Velocity v is related to the pressure p and the sound intensity J in W/m²:

$$v = J/pv \quad (6)$$

and therefore:

$$J = p^2/ZJ \quad (7)$$

Normal conversation at about one meter distance has a sound pressure level between about 40 dB and about 60 dB SPL. If the sound has to travel through an ear canal with an aperture of 0.7×0.7 cm², then earphones would use about 480 pW to produce a sound pressure level of 70 dB (at least ten times normal conversation sound pressure level at a one meter distance). In one example, Ultimate Ears 7 Pro (UE7 Pro) headphones have a sensitivity of 124 dBSPL per mW of input power and an impedance of 17.5Ω at 1 kHz. Thus, these headphones use 4.0 nW of power to operate per channel and produce a voltage of 260 µV rms. Furthermore, according to equations (1)-(4), for Ultimate Ears 7 Pro headphones, the primary winding of the transformer would have 2652 turns and the 0.7V DAC 272 would have a maximum current of 5.68 nA. In another example, the Apple in-ear headphones, such model MA850 G/B have a sensitivity of 109 dBSPL/mW and an impedance of 23Ω at 1 kHz. Thus, these headphones use 130 nW per channel and produce a voltage of 1.70 mV rms. Furthermore, according to equations (1)-(4), for the Apple in-ear headphones, the primary winding of the transformer would have 411 turns, and the 0.7V DAC 272 would have a maximum current of 180 nA.

Figure 5:
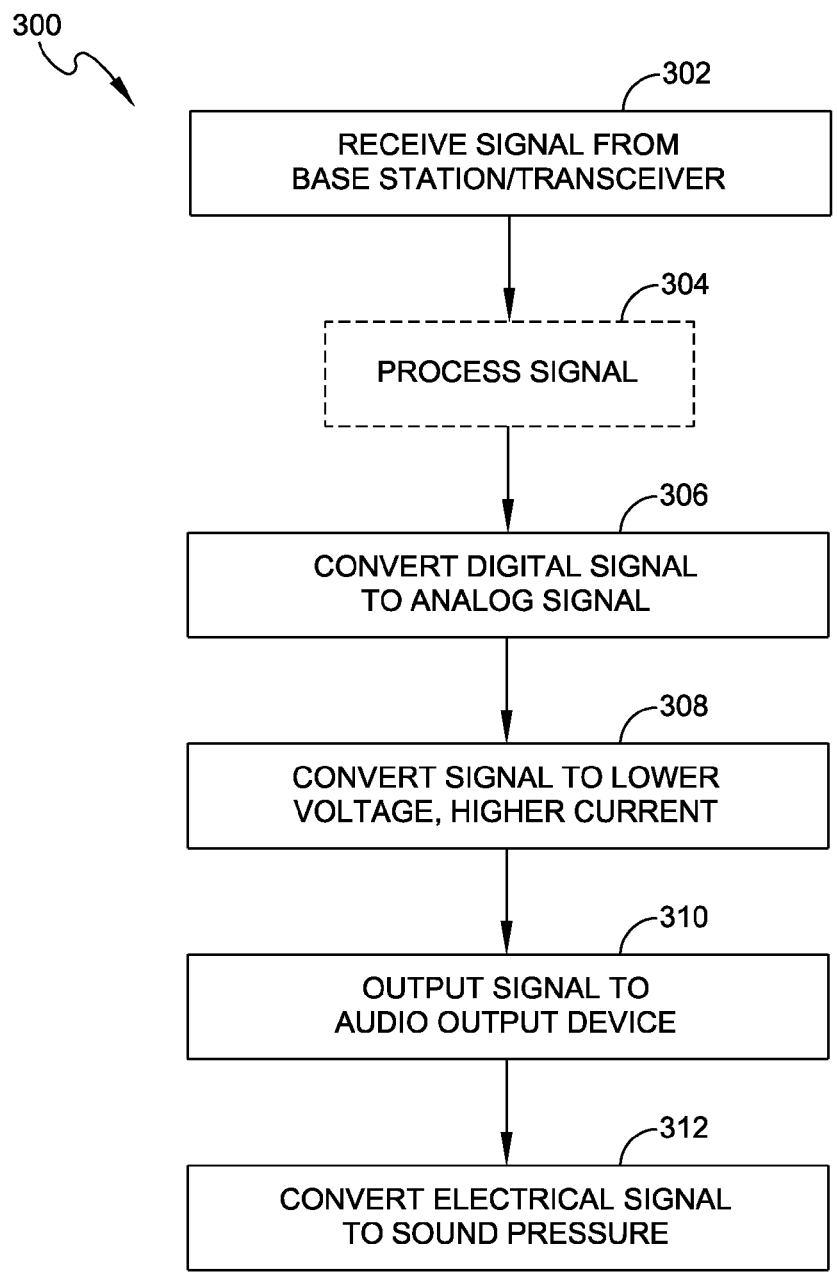
FIG. 5 is a flow chart of a method of powering an audio output device in accordance with aspects of the present invention.

FIG. 5 is a flow chart of a method of powering an audio output device, according to an embodiment of the invention. In one example, the audio output device is the earphones 276 of FIG. 4. In block 302, the analog RF interface of a wireless communication device receives an RF signal from a base station. The analog RF interface may be the interface 202 of FIG. 3. The analog RF interface demodulates the RF signal to produce an input data signal, and sends the input data signal to the digital control block 204. At block 304, the digital control block optionally processes the signal, for example by decoding the data from a compressed representation. At block 306, a digital-to-analog converter converts the digital signal to an analog signal. The digital-to-analog converter may be the DAC 272 described with respect to FIG. 4. According to one embodiment, the analog signal has a dynamic voltage range that varies from about zero volts up to a CMOS logic or sub-threshold logic level. In various embodiments, the voltage may be about 0.7 V, about 1.8 V, or between about 0.7 V and about 1.8 V. At block 308, a transformer converts the analog signal to a lower voltage analog signal having a higher current. According to one feature, the transformer converts the signal with minimal power loss. Power loss is typically 10-20 percent for conventional, large transformers, making them eighty to ninety percent efficient. According to various examples, the transformer is about ninety-nine percent efficient, about ninety-five percent efficient, about ninety percent efficient, about eighty percent efficient, or between about ninety and about ninety-nine percent efficient. The transformer may be the transformer 274 described with respect to FIG. 4. At block 310, the low voltage analog signal is output to an audio output device. At block 312, the output electrical signal is converted to sound pressure.

In one embodiment, the received signal provides power to the wireless communication device and includes data. In another embodiment, the received signal is a packet designed specifically for transmitting audio data over the channel. In another embodiment, the received signal provides power to the wireless communication device, and a different signal provides the data.

Figure 6:
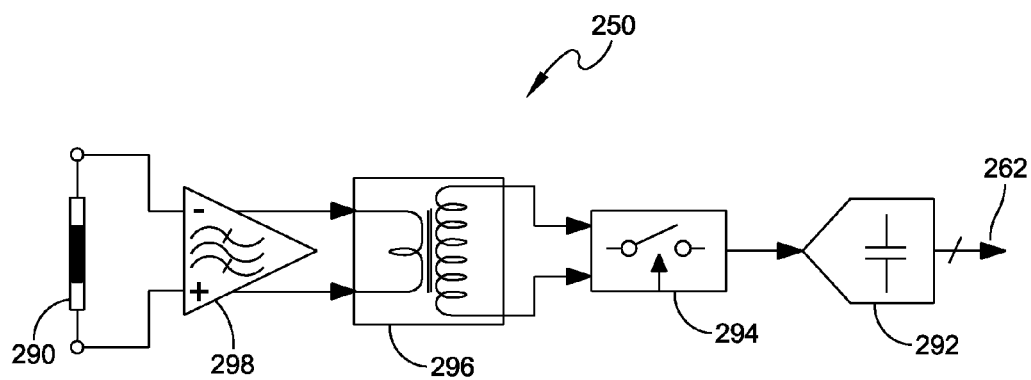
FIG. 6 is a schematic diagram of circuitry connected to a microphone in accordance with aspects of the present invention.
Figure 8A:
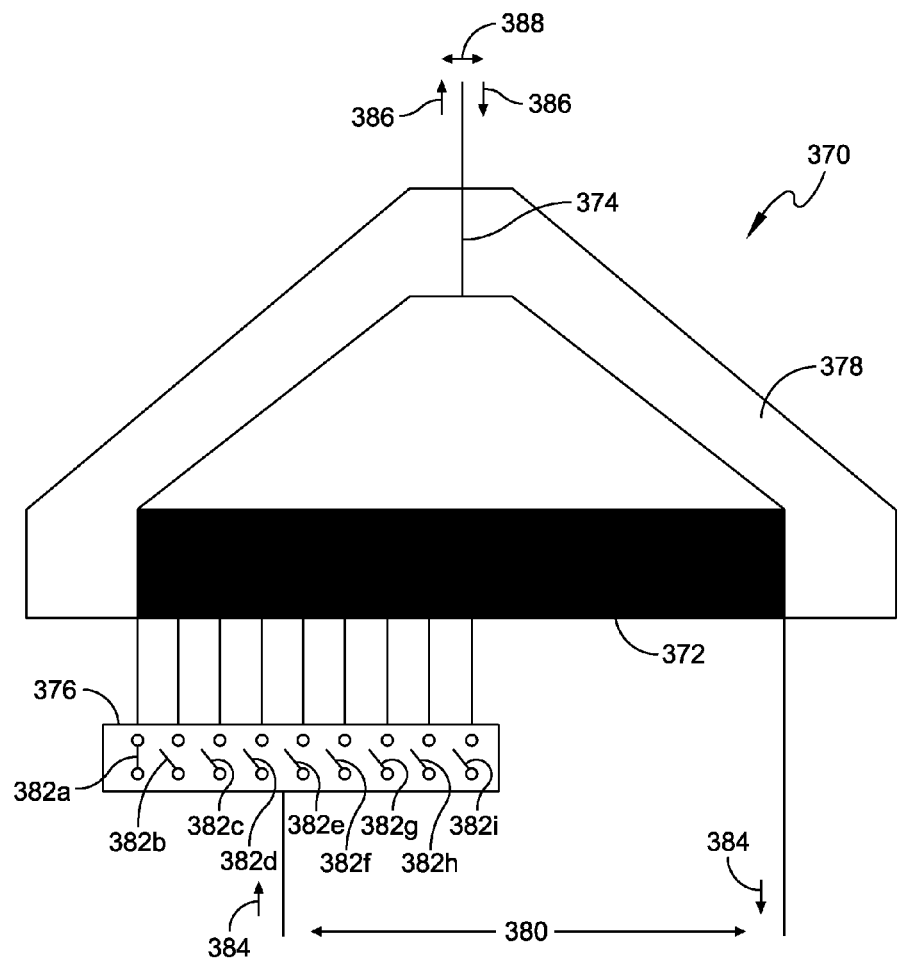
FIG. 8A is a schematic diagram of a top view of a transformer in accordance with aspects of the present invention.

FIG. 6 is a schematic diagram of the audio input section 250 and includes a microphone 290, a buffer 298, a transformer 296, a sample-and-hold circuit 294, and an analog-to-digital converter (ADC) 292, according to an embodiment of the invention. According to one embodiment, the audio input section 250 may also include a variable gain amplifier, for example connected to the buffer 298 and the transformer 296. According to one embodiment, the sample-and-hold circuit 294 is part of the ADC 292, and in another embodiment, the audio input section 250 does not include a sample-and-hold circuit 294. In another embodiment, the buffer 298 may be a low-noise amplifier. In one example, the transformer 296 is an impedance transformer and amplifies the voltage by decreasing the current. In another embodiment, the audio output section 250 does not include a buffer 298, and the buffer 298 functions are implemented in the transformer 296. In one example, the transformer is a semiconductor transformer, such as the transformer 370 shown in FIG. 8A or the transformer 390 shown in FIGS. 8B and 8C. In one embodiment, the transformer is the transformer 274 used in the audio output section 230. In one example, a single transformer, such as the transformer 370 shown in FIG. 8A, is used for both the audio output device 230 and the audio input device 250, and one or more switches can be used to repeatedly adjust the turns ratio of the transformer as appropriate for each device.

The analog-to-digital converter 292 has an output signal 262. The microphone 290, buffer 298, variable gain amplifier 296, sample-and-hold circuit 294 and analog-to-digital converter 292 are elements of a wireless communication device and are designed to consume minimal power in transmitting the audio input signal from the microphone 290 to the digital control block of the wireless communication device.

The microphone 290 includes an audio transducer that converts sound pressure differences into electrical energy. In one example, the microphone 290 is an electret microphone, and it may be an electret MEMS microphone. In another example, the microphone 290 is a dynamic microphone. According to one feature, the microphone 290 operates with a zero Volt bias. The power usage of the microphone may be between about 10 pW and about 200 pW, and may be calculated using Equations 8-11. In particular, the power in a pressure field may be defined using Equation 8.

$$P = Ap^2 / Z \quad (8)$$

where p is the pressure, Z is the acoustic impedance of air, and A is the area of the aperture of the microphone. The acoustic impedance of air Z may be defined using Equation 9.

$$Z = \rho \cdot c \quad (9)$$

where $\rho$ is the density of the medium (here, air), and c is the speed of sound. According to one example, for air at a temperature of 20° C., the density of air is 1.184 kg/m$^3$, the speed of sound is 346.1 m/s, and the impedance Z is about 409.8 Pa s/m. Note that 60 dB SPL is $2.0 \cdot 10^{-3}$ Pascal at a distance ($r_1$) of 1 m. In one example, the distance between the microphone and the mouth ($r_2$) is only about ⅓ meter, so the SPL of the transmitted signal is greater. In particular, the pressure is increased by the ratio $r_1/r_2$. The Power may also be defined for the capacitive sensor using equation 10.

$$P = \frac{1}{2} C V^2 f \quad (10)$$

where C is capacitance, V is voltage, and f is frequency. Equation 10 may be used calculate a voltage to pressure ratio, assuming all the sound power that enters the aperture is converted to electrical energy as shown in Equation 11.

$$\frac{dV}{dp} = \sqrt{\frac{2A}{ZCf}} \quad (11)$$

According to one example, the microphone is a Caltech MEMS microphone, as described by T. Y. Hsu, W. H. Hsieh, Y.-C. Tai and K. Furutani in "A Thin Film Teflon Electret Technology for Microphone Applications," A Solid State Sensor, Actuator and Microsystems Workshop, Hilton Head, 1996, pp. 235-238 (http://www.audiocircuit.com/A-PDF/AA-Materials-MAT/Membranes-ME/941-DUP-Teflon-elect-A-A01.pdf). The area A of the aperture of the microphone is $12 \times 10^{-6}$ m$^2$ (3.5 mm per side). Using equations 8-11, if the input frequency f is 250 Hz, the microphone is estimated to use about 13 pW of power.

In another example, the microphone is a Brüel and Kjær 4953 electret microphone. The area A of the aperture of the microphone is $127 \times 10^{-6}$ m$^2$ (½" diameter). Using equations 8-11, if the input frequency f is 250 Hz, the microphone is estimated to use about 140 pW of power.

According to one embodiment, the peak voltages produced by the microphone are between about 900 μV and about 1.0 mV.

The signal from the microphone 290 is sent to the low noise amplifier 298. The low noise amplifier 298 amplifies the signal and transmits it to the transformer 296. According to one embodiment, the buffer 298 is a low-noise transimpedance amplifier operating complementary metal-oxide semiconductor (CMOS) voltage levels. The CMOS voltage levels may be about 0.7 V, about 1.8 V, or between about 0.7 V and about 1.8 V.

In one embodiment, a variable gain amplifier may be used to amplify the amplitude of the signal, and output it to an analog-to-digital converter 292. In one embodiment, the analog-to-digital converter is the sample-and-hold circuit 294, followed by an integrating ADC 292. In another embodiment, the analog-to-digital converter 292 may be a pulse-density converter, such as a sigma-delta analog-to-digital converter. In another embodiment, the analog-to-digital converter 292 may be a delta-encoded ADC. In another embodiment, the analog-to-digital converter 292 is a success-approximation ADC. The sample-and-hold circuit 294 samples the voltage of the signal and holds it at a constant level for a period of time. The period of time may be between about 100 ns and about 100 µs, and it may be about 100 ns, about 250 ns, about 500 ns, about 750 ns, about 1 µs, about 10 µs, about 25 µs, about 50 µs, about 75 µs or about 100 µs. The sample-and-hold circuit 294 outputs the signal to the ADC 292.

According to one example, the buffer 298, transformer 296 and analog to digital converter 292 use about 247 nanowatts of power, based on an 11 fJ/step metric. According to other examples, the buffer 298 and a variable gain amplifier use about 337 nW of power or about 584 nW of power. In other examples, the power usage of the buffer 298 and a variable gain amplifier is about 200 nW, about 250 nW, about 300 nW, about 350 nW, about 400 nW, about 450 nW, about 500 nW, about 550 nW, about 600 nW, about 750 nW or about 1000 nW.

According to one embodiment, the signal input to the ADC 292 has a voltage between about 90 µV and about 1.0 mV, and the front-end gain of the ADC 292 is about 40 dB or greater than about 40 dB. In one embodiment, the ADC 292 uses a switch-capacitor direct-conversion binary search array. According to one feature, this minimizes power consumption by the ADC 292. In one example, the ADC 292 is a successive-approximation ADC, and it may be a 450 nW, 12-bit, 1 kS/s SAR ADC which uses about 3.6 µW of power to capture voice up to 8 kS/s. In another example, the ADC 292 is a 7.5-bit ENOB (effective number of bits) 7.75 µW design, with a signal-to-noise dynamic range of about 46.92 dB. This design may be implemented in a 0.18 µm CMOS (complementary metal oxide semiconductor), which runs at about 500 kS/s, and has a Figure of Merit (FOM) of 86 fJ/conversion step.

Figure 7:
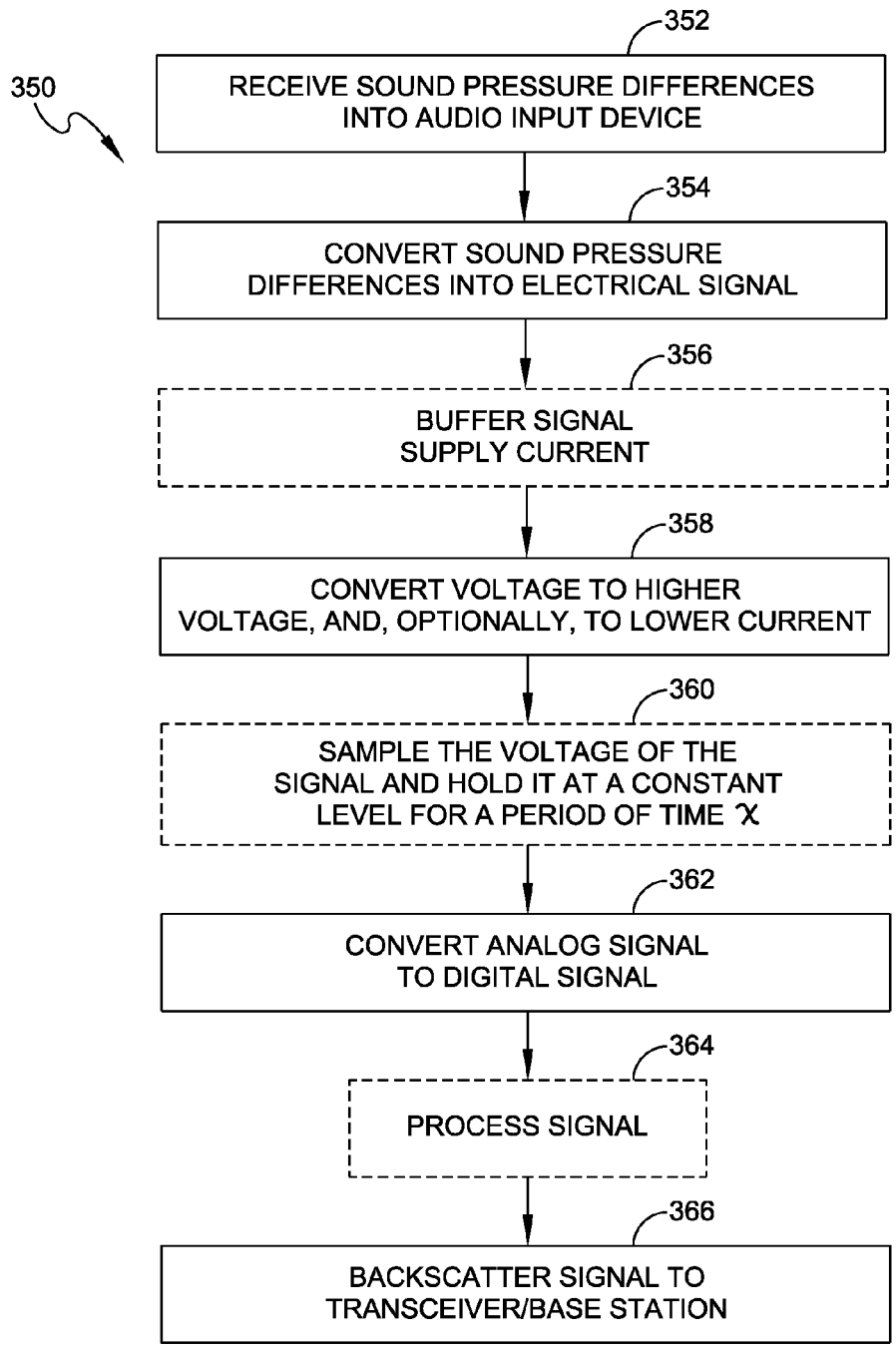
FIG. 7 is a flow chart of a method of receiving audio input in accordance with aspects of the present invention.

FIG. 7 is a flow chart of a method 350 of receiving audio input according to an embodiment of the invention. At block 352, audio input is received, for example by a microphone. The audio input may be sound pressure differences. At block 354, sound pressure differences are converted into electrical energy. Optionally, at block 356, the signal may be buffered to produce voltage and current. Optionally, at block 358, the incoming signal may be converted to a signal with a higher voltage and a lower current. In one embodiment, the amplitude of the signal may also be amplified, for example by a variable gain amplifier. According to one embodiment, an impedance-transformation circuit converts current and voltage (at block 356) and amplifies the amplitude of the voltage signal. At block 360, the voltage of the signal is optionally sampled and held for a period of time. At block 362, the analog signal is converted to a digital signal. According to one embodiment, the conversion of the analog signal to a digital signal at block 362 includes sampling the voltage of the signal and holding it for a period of time. The digital signal is output to the digital control block of a wireless communication device. Optionally, at block 364, the output signal is processed by a processor. At block 366, the output signal is sent out to a backscatter transceiver, which may be, for example, the base station or another RF receiver.

FIG. 8A is a schematic diagram of a transformer 370, including a primary winding 372, a secondary winding 374, a switch module 376, and a core 378, according to an embodiment of the invention. According to one feature, the transformer 370 is a microfabricated transformer, and the substrate for the fabrication may be silicon or another selected material suitable for microfabrication. The primary winding 372 and the secondary winding 374 are wrapped around the core 378. The primary winding 372 has a primary current 384. The primary current 384 travels through the switch module 376 and through the primary winding 372. The secondary winding 374 has a secondary current 386.

According to one feature, the current 384 passing through the primary winding 372 creates a magnetic field and a changing magnetic field induces a voltage 380 across the ends of the primary winding 372. The current 386 passing through the secondary winding 374 induces a voltage 388 across the ends of the secondary winding 374. According to one feature, the voltage 380 across the primary winding 372 is greater than the voltage 388 across the secondary winding 386.

The switch module 376 is connected to the primary winding 372, and may include one or more switches 382a-382i. The switch module 376 may be used to adjust the number of turns in the primary winding 372. In one example, when the left-most switch 382a of the switch module 376 is closed, the primary winding 372 has 840 turns. In another example, when only the right-most switch 382i is closed, the primary winding 372 has 410 turns. In typical embodiments, only one of the switches 382a-382i is closed at a time. According to one embodiment, the switch 376 is an SP9T switch.

According to one feature, the core 378 is constructed of a magnetic material. For example, the core 378 may be a ferromagnetic alloy on a silicon surface. In another example, the core 378 may be a CoZrRe alloy, such as that described by Mino et al. in "A new planar microtransformer for use in microswitching converters." Magnetics, IEEE Transactions, vol. 28(4) pp. 1969-73 (2002).

Figure 8B:
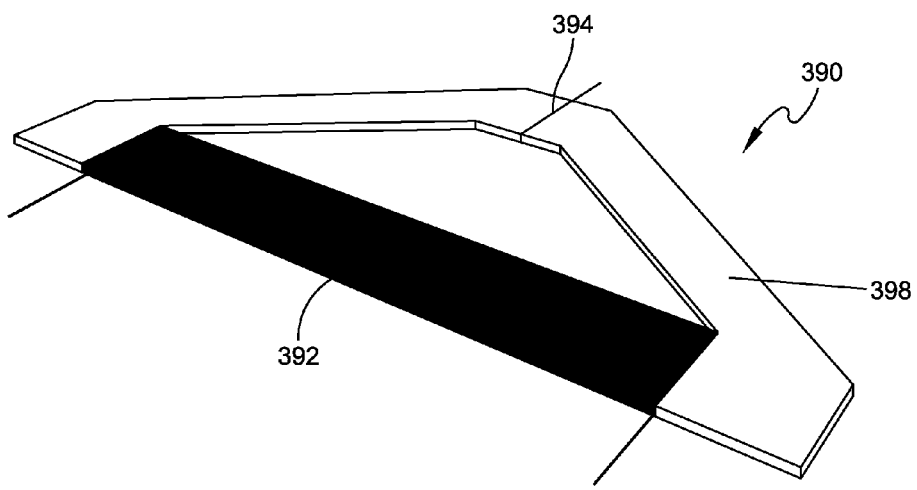
FIG. 8B is a side perspective view of a transformer in accordance with aspects of the present invention.
Figure 8C:
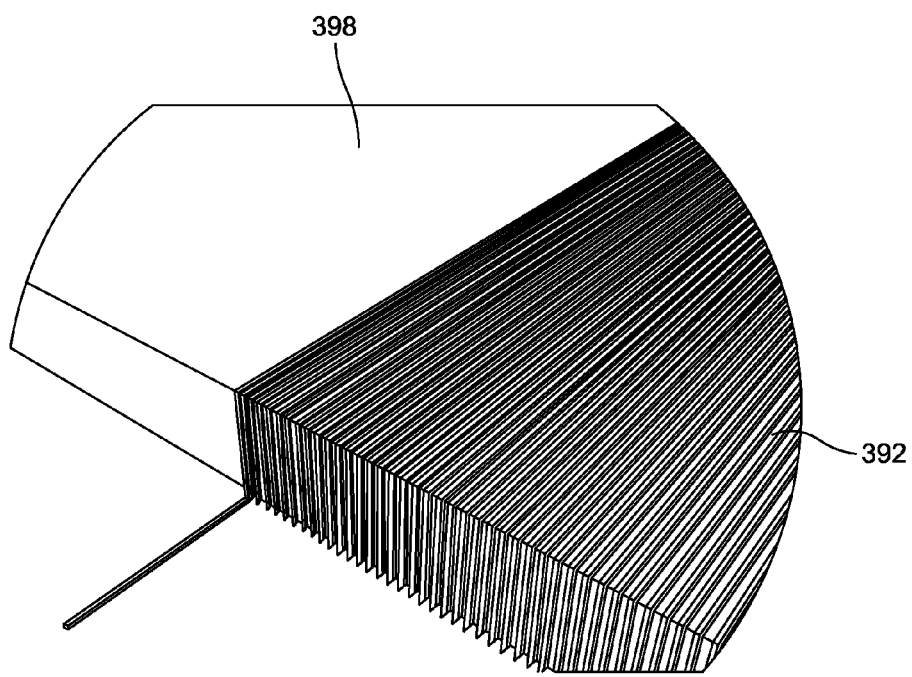
FIG. 8C is an exploded view of a transformer core and a winding in accordance with aspects of the present invention.

FIG. 8B is a side perspective view of a transformer 390 including a primary winding 392, a secondary winding 394 and a core 398, according to an embodiment of the invention. The primary winding 392 and the secondary winding 394 are wrapped around the core 398. FIG. 8C is an exploded view of the core 398 of the transformer 390 showing part of the primary winding 392, according to an embodiment of the invention. In one example, the primary winding 392 has 840 turns and the secondary winding 394 has one turn. In another example, the primary winding 392 has 410 turns and the secondary winding 394 has one turn. According to one feature, the core 378 is constructed on silicon and made with a ferromagnetic alloy.

Figure 9:
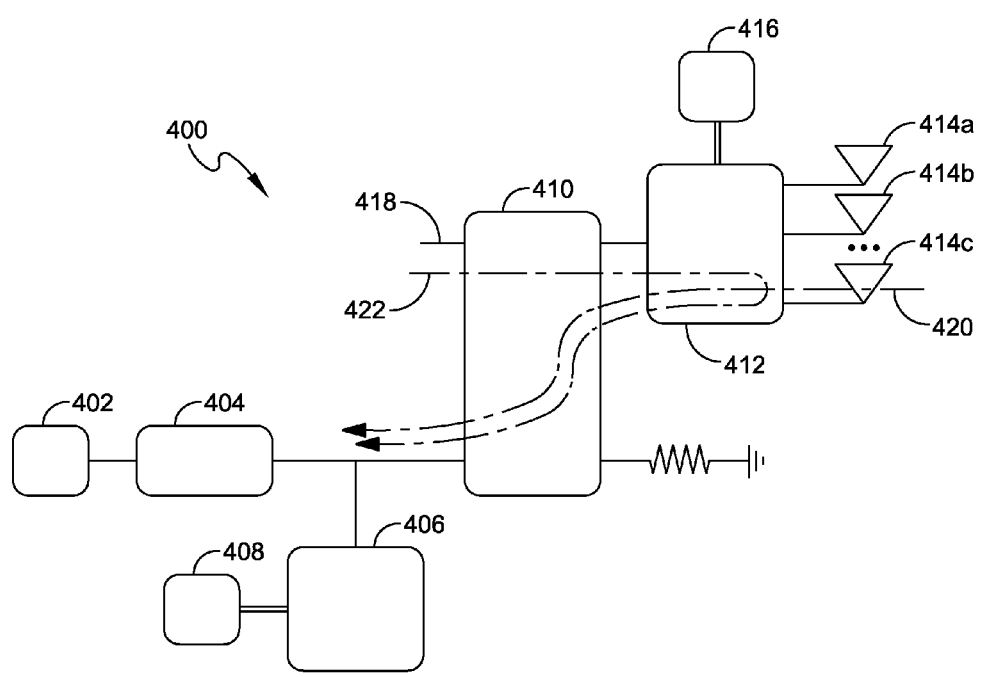
FIG. 9 is a schematic diagram of a base station showing the path of a transmitted signal to a receiver in accordance with aspects of the present invention.

FIG. 9 is a schematic diagram of a base station 400 that may be used in conjunction with the wireless communication devices discussed above. The base station 400 includes a receiver, modem and microprocessor 402, a demodulator 404, a power detector 406, a microprocessor 408, a coupler 410, a switch 412, antenna ports 414a-414c, and a digital control block 416. The diagram shows the path of a backscattered signal 420 from one or more wireless communication devices to the receiver 402. When the base station 400 is turned on, it powers wireless communication devices within its range. The power detector 406 is connected to the microprocessor 408, and monitors the RF power into the receiver level at the base station. In another embodiment, another power detector monitors the RF power level of the transmitted signal.

The coupler 410 is used to couple the transmitter and the receiver of the base station 400 to the antenna ports through the switch 412 under control of the digital control block. The coupler provides the backscatter RF signal to the receiver, which includes a demodulator 404, which demodulates the input RF signal to remove data from the signal. The transmitter includes an analog baseband signal, which may come from a digital to analog converter and low pass filter, and a modulator (I&Q mixer) that creates an AM-modulated RF signal to be directed to a wireless communication device via an antenna.

Figure 10:
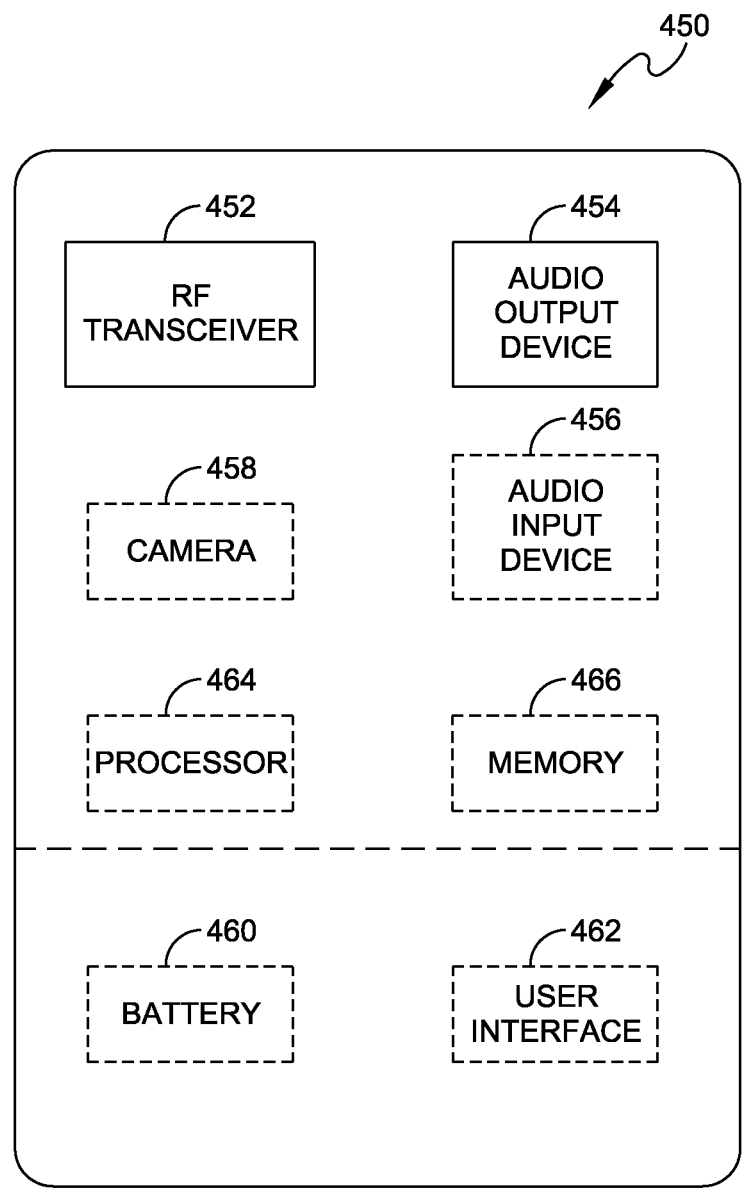
FIG. 10 is a block diagram of a wireless communication device in accordance with aspects of the present invention.

FIG. 10 is a block diagram of a wireless communication device 450 including an RF transceiver 452 and an audio output device 454, according to an embodiment of the invention. The communication device 450 may also include an audio input device 456, a camera 458, a processor 464, memory 466, a battery 460 and a user interface 462. The user interface may include a keyboard and display. The wireless communication device also includes a processing section. According to one feature, the wireless communication device 450 is passively powered by an RF signal. For example, the RF signal may passively power the RF transceiver 452 and one or more of the audio output device 454, the audio input device 456 and the camera 458.

In one embodiment, the wireless communication device 450 is a dual mode wireless communication device, such as a cellular telephone or a smart phone, and includes a battery 460. In a first mode, the wireless communication device 450 operates passively using an RF signal and does not draw DC power from the battery 460. The functionality of the wireless communication device 450 is limited in the first mode, and in one embodiment in the first mode, the dual mode wireless communications device communicates with a base station and can continue to receive messages, for example email messages, web content, text messages and phone calls without drawing power from the battery. In a second mode, the wireless communication device 450 draws power from the battery, and can perform all the functions of a typical wireless communication device of its kind.

In another embodiment, in a first mode, the wireless communication device 450 operates using an RF signal and draws minimal DC power from the battery 460. This may be considered a battery-assisted passive mode. The functionality of the wireless communication device 450 is limited in the first mode, and in one embodiment in the first mode, the dual mode wireless communications device communicates with a base station and can continue to receive messages, for example email messages, web content, text messages and phone calls without drawing power from the battery. In a second mode, the wireless communication device 450 draws power from the battery, and can perform all the functions of a typical wireless communication device of its kind.

According to one embodiment, the wireless communication device is a mobile phone, and the RF signal provides an indication to the mobile phone that it is receiving an incoming call. The receipt of the indication that the mobile phone is receiving an incoming call wakes up the mobile phone and it can receive the call.

Figure 11:
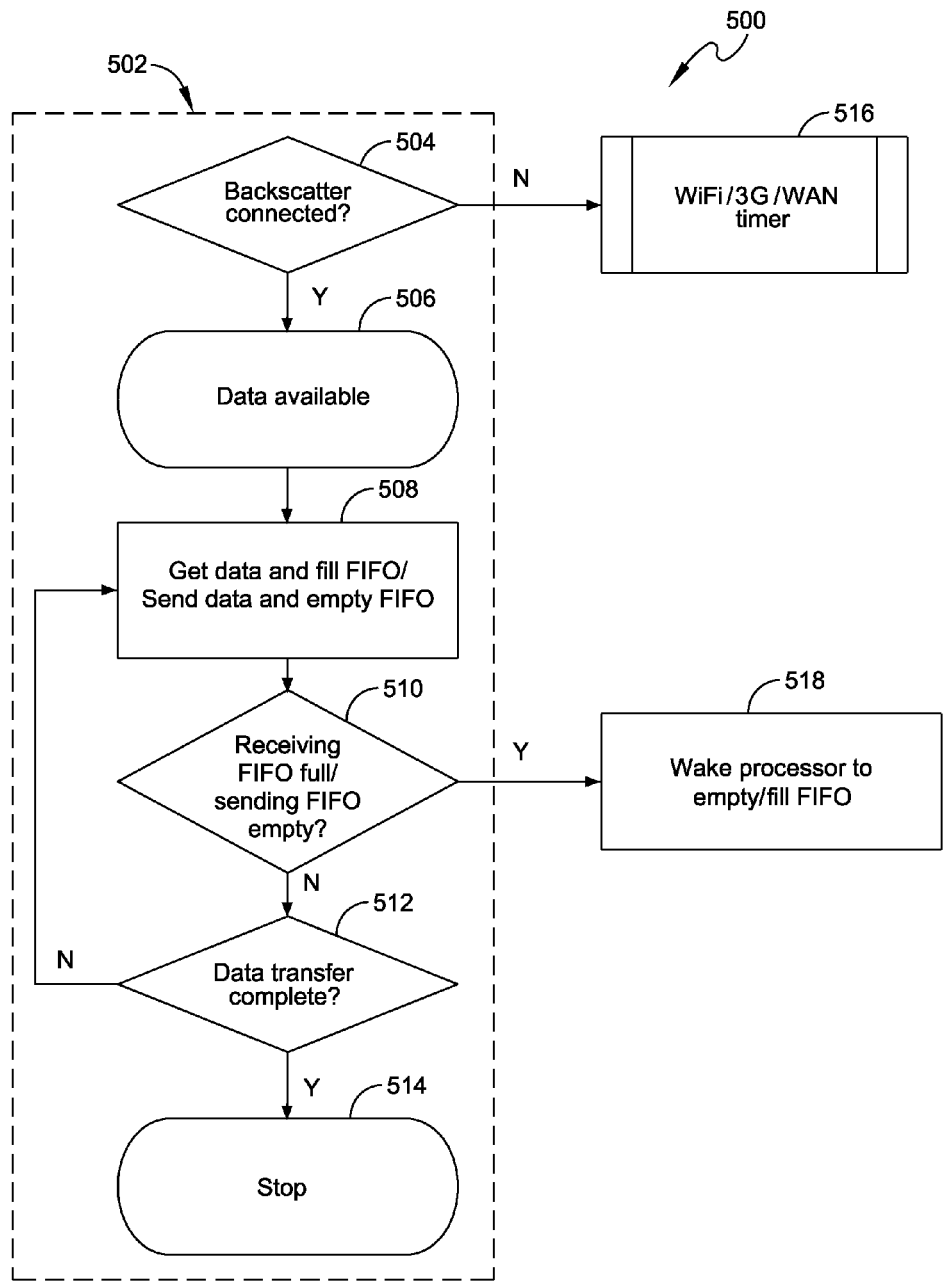
FIG. 11 is a flow chart of a method of sending and receiving data in a dual mode wireless communication device in accordance with aspects of the present invention.

FIG. 11 is a flow chart of a method 500 of sending and receiving data in a dual mode wireless communication device according to an embodiment of the invention. The method 500 includes a backscatter method 502 that can be performed without drawing power from a battery. The backscatter method 502 may also be performed using some battery power but significantly less battery power than current communication devices. At block 504, the wireless communication device determines whether there is a backscatter connection available by searching for an RF signal. If no backscatter connection is available, the wireless communication device operates in its battery-powered mode using another connection, such as a WiFi, 3G, 4G or other WLAN\WAN connection. If a backscatter connection is available, at block 506 the wireless communication device establishes a connection with the base station and determines if there is data available. In one example, the data represents one or more email messages. The data may be available to download from a server, or to upload from the wireless communication device to a server. In various embodiments, the data may be sent by modifying a protocol, such as TCP/IP (Transmission Control Protocol/Internet Protocol) or UDP/IP (User Datagram Protocol/Internet Protocol). In another embodiment, the data is sent directly over the wireless channel as packetized data, for example, SMTP (Simple Mail Transfer Protocol), HTML (Hyper Text Markup Language), SMS (Short Message Service), IM (Instant Messaging), phone call information, or voice-mail.

At block 508, the wireless communication device receives or sends data, thereby filling or emptying a first-in first out (FIFO) queue. According to one implementation, at block 510, the wireless communication device determines if the FIFO receiving data is full. If the FIFO receiving data is full, at block 518 the wireless communication device wakes up the processor to empty the FIFO. If the FIFO receiving data is not full, at block 512 the wireless communication device determines if the data transfer is complete. If the data transfer is not complete, the method returns to block 508 and receives more data. According to one example, the amount of data in the FIFO is the fill state of the FIFO. In this example, if the FIFO is empty, the fill state indicates that the FIFO is empty, and if the FIFO is full, the fill state indicates that the FIFO is full. In one example, the fill state indicates the amount or percentage of space remaining in the FIFO.

In another implementation, at block 510, the wireless communication device determines if the FIFO sending data is empty. If the FIFO sending data is empty, at block 518 the wireless communication device wakes up the processor to fill the FIFO. If the FIFO receiving data is not empty, at block 512 the wireless communication device determines if the data transfer is complete. If the data transfer is not complete, the method returns to block 508 and sends more data. The FIFO may be used in the fully passive audio mode or it may be used for other types of data. According to one embodiment, the fully passive audio mode functions without a FIFO.

According to one feature, the method 500 preserves battery power in a dual mode wireless communication device by using the backscatter method 502 when available. The wireless communication device can be in a sleep mode and continue to receive messages while performing the method 502 without drawing any power from the battery, greatly extending the life of the battery.

In embodiments described above, wireless communications devices communicate with a local base station. In one implementation, a facility may include a number of base stations distributed throughout the facility and a user of a wireless device may move through the facility connecting to different base stations based on the user's locations. The base stations may communicate with each other using wired or wireless technologies such as WiFi, 3G and 4G, to coordinate communications with each of multiple wireless communications devices. Also, each base station may operate with more than one wireless communications device.

As discussed above, embodiments of the present invention provide significant advantages in wireless communications devices by allowing the devices to operate without battery power completely or in certain modes of operation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A wireless communications device comprising:
   a battery configured to provide power to operate the wireless communications device in a first mode of operation;
   an RF interface configured to:
      receive an RF signal; and
      generate operating power for direct use by the wireless communications device from the RF signal in a second mode of operation; and
   a processing section comprising one or more processors;
   wherein the wireless communications device is configured to:
      operate on battery power in the first mode of operation;
      detect available RF power;
      enter the second mode of operation from the first mode of operation, wherein, during the second mode of operation, the generated operating power is used for operation of the device; and
      detect a fill state of a memory and, based on the fill state, change the processing section from the second mode to the first mode and conduct data transfer with the memory.

2. The wireless communications device of claim 1, wherein the wireless communications device is configured such that the processing section enters a sleep mode in the second mode of operation.

3. The wireless communications device of claim 1, wherein the RF interface is configured to receive data from the RF signal in the second mode of operation and the wireless communications device is configured to store the data in the memory.

4. The wireless communications device of claim 3, wherein the wireless communications device is further configured to move the data from the memory using the one or more processors of the processing section.

5. The wireless communications device of claim 1, wherein the RF interface is configured to modulate the RF signal and provide backscatter communication with a source of the RF signal.

6. The wireless communications device of claim 5, wherein modulating the RF signal includes modulating the RF signal with identification data of the wireless communications device.

7. The wireless communications device of claim 6, wherein the source of the RF signal is a base station having at least one network connection, wherein the base station is configured to receive the identification data and provide the identification data to at least one remote device over the network connection.

8. The wireless communications device of claim 7, wherein the base station is further configured to receive from a remote device over the network connection a message for the wireless communications device and modulate the RF signal to provide the message to the wireless communications device.

9. The wireless communications device of claim 5, wherein the source of the RF signal is a base station having at least one network connection, wherein the base station is configured to receive data from the wireless communications device and provide the data to a remote device over the network connection.

10. The wireless communications device of claim 1, wherein the wireless communications device is configured to read data from the memory and provide an output message to a source of the RF signal by modulating the RF signal.

11. A method comprising:
   operating a wireless communications device in a first mode of operation using operating power supplied by a battery connected to the wireless communications device;
   detecting presence of an RF signal;
   entering a second mode of operation from the first mode of operation;
   generating operating power from the RF signal for direct use by the wireless communications device, wherein, during the second mode of operation, the generated operating power is used for operation of the device; and
   detecting a fill state of a memory and, based on the fill state, changing a processing section of the wireless communications device from the second mode to the first mode and conducting data transfer with the memory.

12. The method of claim 11, further comprising:
   extracting data from the RF signal while operating the wireless communications device in the second mode of operation; and
   storing the data in the memory.

13. The method of claim 12, further comprising moving the data from the memory using one or more processors of the processing section.

14. The method of claim 11, further comprising reading data from the memory and providing an output message from the wireless communications device by modulating the RF signal.

15. The method of claim 11, further comprising modulating the RF signal to provide backscatter communication with a source of the RF signal.

16. The method of claim 15, wherein modulating the RF signal includes modulating the RF signal with identification data of the wireless communications device.

17. The method of claim 13, wherein the source of the RF signal is a base station having at least one network connection, and wherein the method further comprises receiving the identification data at the base station and providing the identification data to at least one remote device over the network connection.

18. The method of claim 17, further comprising receiving at the base station from a remote device over the network connection a message for the wireless communications device, and modulating the RF signal to provide the message to the wireless communications device.

19. The method of claim 15, wherein the source of the RF signal is a base station having at least one network connection, and wherein the method further comprises receiving data from the wireless communications device at the base station and providing the data to a remote device over the network connection.

20. The method of claim 11, wherein the wireless communications device is configured such that the processing section enters a sleep mode in the second mode of operation.

21. A wireless communication system comprising:

a base station having at least one network connection and an RF transceiver configured to generate an RF signal and communicate using backscatter communication; and a wireless device comprising:
- a battery configured to provide power to operate the wireless device in a first mode of operation;
- a processing section comprising one or more processors; and
- an RF interface configured to:
  - receive the RF signal from the base station; and
  - generate operating power for direct use by the wireless device from the RF signal in a second mode of operation;
- wherein the wireless device is configured to:
  - operate on battery power in the first mode of operation;
  - detect available RF power;
  - enter the second mode of operation from the first mode of operation, wherein, during the second mode of operation, the generated operating power is used for operation of the device; and
  - detect a fill state of a memory and, based on the fill state, change the processing section from the second mode to the first mode and conduct data transfer with the memory.

22. The system of claim 21, wherein the wireless device is configured such that the processing section enters a sleep mode in the second mode of operation, and configured to read data from the memory and provide an output message to the base station by modulating the RF signal.

23. The system of claim 21, wherein the RF interface is configured to modulate the RF signal with identification data of the wireless device in order to provide the identification data to the base station.

24. The system of claim 23, wherein the base station is configured to receive the identification data and provide the identification data to at least one remote device over the network connection.

25. The system of claim 24, wherein the base station is further configured to receive from a remote device over the network connection a message for the wireless device, and modulate the RF signal to provide the message to the wireless device.

26. The system of claim 21, wherein the RF interface is configured to receive data from the RF signal in the second mode of operation and the wireless communications device is configured to store the data in the memory.

27. The system of claim 26, wherein the wireless communications device is further configured to move the data from the memory using the one or more processors of the processing section.

28. The system of claim 21, wherein the RF interface is configured to modulate the RF signal and provide backscatter communication with the base station.

29. The system of claim 28, wherein the base station is further configured to receive data from the wireless communications device and provide the data to a remote device over the network connection.

* * * * *